May 31, 1927.
J. H. CLARK
ATTACHMENT FOR VEHICLES
Filed Feb. 20, 1923
1,630,525
3 Sheets-Sheet 1
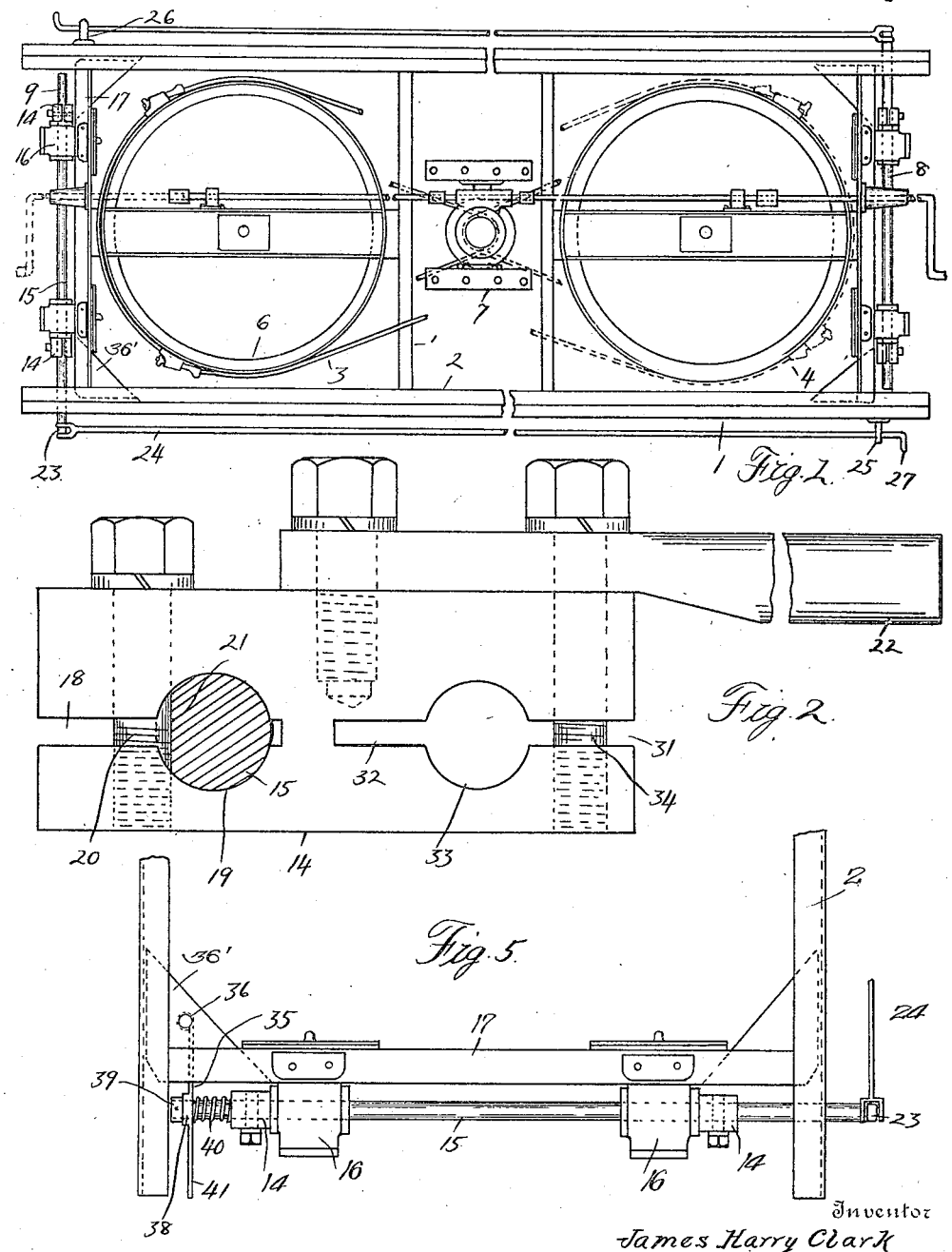
Inventor
James Harry Clark May 31, 1927.
J. H. CLARK
1,630,525
ATTACHMENT FOR VEHICLES
Filed Feb. 20, 1923   3 Sheets-Sheet 2
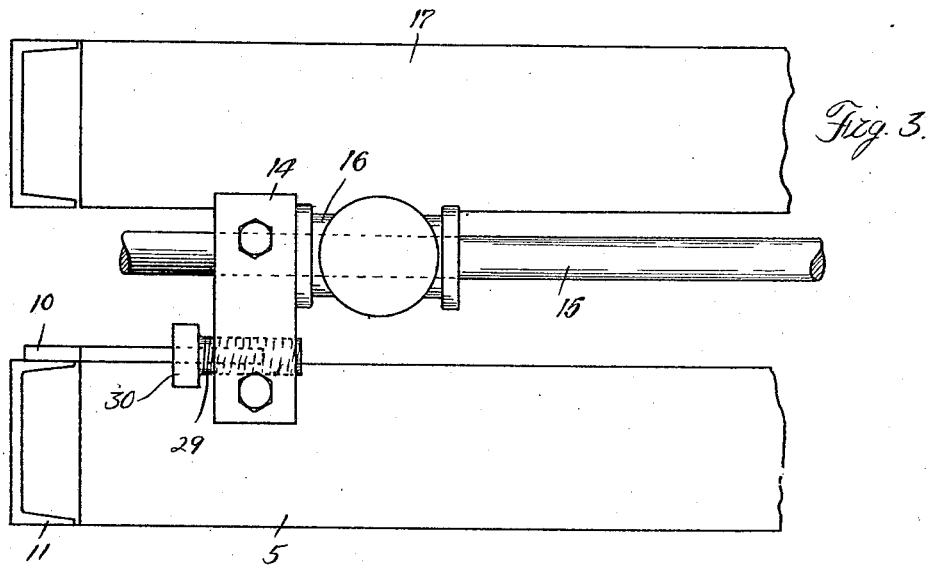
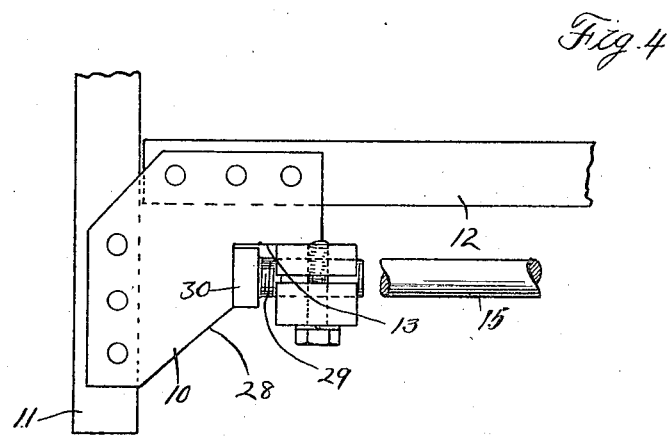
Inventor
James Harry Clark
By Whittemore Hulbert Whittemore
+Belknap   Attorneys May 31, 1927.

J. H. CLARK 1,630,525

ATTACHMENT FOR VEHICLES

Filed Feb. 20, 1923  3 Sheets-Sheet 3

Inventor
James Harry Clark

By Whittemore Hulbert Whittemore
Belknap  Attorneys

Patented May 31, 1927.

1,630,525

UNITED STATES PATENT OFFICE.

JAMES HARRY CLARK, OF RIVER ROUGE, MICHIGAN.

ATTACHMENT FOR VEHICLES.

Application filed February 20, 1923. Serial No. 620,125.

This invention relates to vehicles and refers more particularly to the wheeled trucks or under-frames thereof.

An object of the invention is to provide a vehicle with a pair of wheeled trucks which are identical in construction and which are preferably pivotally connected to the main frame so that they may be readily steered.

Another object is to provide simple and efficient means for retaining either one of the wheeled trucks in a predetermined position with respect to the main frame while permitting the other wheeled truck to be steered.

Another object is to provide the wheeled truck with retaining means which is strong and durable in construction and which may be operated from either end of the vehicle.

Another object is to provide reliable and effective means for automatically locking the retaining means in adjusted position.

Another object is to provide a strong and durable construction which can be manufactured at a comparatively low cost.

With the above and other objects in view the invention consists of certain novel features of construction, combination and arrangement of parts as will be more fully described and particularly pointed out in the appended claims.

In the accompanying drawings:

Figure 1 is a top plan view of a vehicle embodying my invention;

Figure 2 is a detail elevation of one of the blocks and the actuating handle;

Figure 3 is a fragmentary front elevation of the same construction with a feature added;

Figure 4 is a top plan view of the construction illustrated in Figure 3;

Figure 5 is a fragmentary top plan view of another slightly modified construction;

Figure 6:
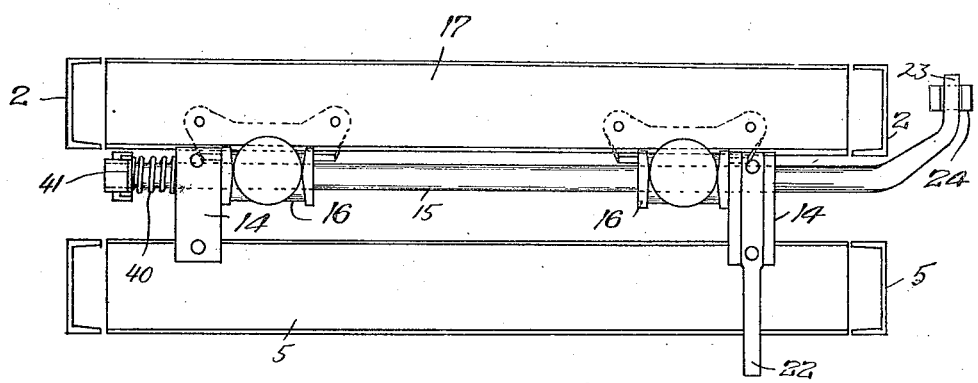
Figure 6 is a front elevation of the construction illustrated in Figure 5.

Referring now to the drawings in which like characters of reference designate corresponding parts throughout the several views and describing first the features which are common to all of the views, the numeral 1 designates a trailer having a horizontal frame 2 and a pair of wheeled trucks 3 and 4 respectively. These trucks are preferably identical in construction and are preferably provided with horizontal frames 5 that are pivotally connected to the frame 2 at the ends thereof by means of a pair of fifth wheels 6. The wheeled trucks are adapted to be steered by suitable mechanism which is designated generally by the numeral 7 and which forms no part of the present invention.

The frames 5 of the trucks are adapted to be alternatively retained in alignment with the frame 2 according to the direction of travel by means of suitable devices which are designated generally by the numerals 8 and 9 respectively. In view of the fact the devices 8 and 9 are identical in construction, only one will be described. In detail, a pair of horizontal gusset plates 10 (see Fig. 4) are rigidly secured to the side bars 11 and to the outer cross bar 12 of the truck frame 5 and are preferably cut away at their inner edges to provide L-shaped portions 13. A pair of substantially rectangular blocks 14 are adapted to engage the L-shaped portions 13 of the plates and are keyed upon a horizontal rock shaft 15 which is journaled in bearings 16 that are detachably secured to a cross bar 17 at the adjacent end of the frame 2. The blocks are preferably provided with longitudinally extending slots 18 which extend from one end thereof to the openings 19 that receive the shaft 15. (See Fig. 2.) Bolts 20 extend through the portions of the blocks upon opposite sides of the slots and normally clamp the blocks in position upon the shaft. The shaft is preferably provided with notches 21 which receive one side of the bolts 20 for positioning the blocks when the device is assembled. A suitable handle 22 is detachably secured to one of the blocks and is adapted to be moved downwardly for swinging both blocks into engagement with the L-shaped portions of the gusset plates. In order that the retaining device may be operated from the opposite end of the vehicle the shaft 15 is preferably bent at one end to provide an arm 23 (see Fig. 6) which is connected to a rod 24 extending along one side of the frame 2 to the opposite end thereof. (See Fig. 1.) The rod 24 is supported by means of brackets 25 and 26 respectively and is provided with a handle 27 at the free end thereof.

The gusset plates 10 are also preferably provided with outwardly inclined edges 28 which connect into the L-shaped portions thereof and which are adapted to guide the blocks into proper engagement with the L-shaped portions. Engagement of the blocks with the inclined edges of the plates will cause the truck frames to move in alignment with the frame 2.

There will now be described the added feature shown in Figs. 3 and 4. In order that the locking device may be readily applied to vehicles having truck frames of different widths, relatively short bolts 29 are threaded into the blocks and are provided with square-shaped heads 30 which are adapted to engage the L-shaped portions of the plates 10. The blocks are also preferably provided with aligned slots 31 and 32 which extend longitudinally thereof upon diametrically opposite sides of the openings 33 which receive the bolts 29. The slots 31 preferably extend to the adjacent ends of the blocks while bolts 34 extend through the portions of the blocks upon opposite sides of the slots 31 and normally clamp the bolts 29 in adjusted position. One of the bolts 34 also assists in securing the handle 22 in position.

Figure 7:
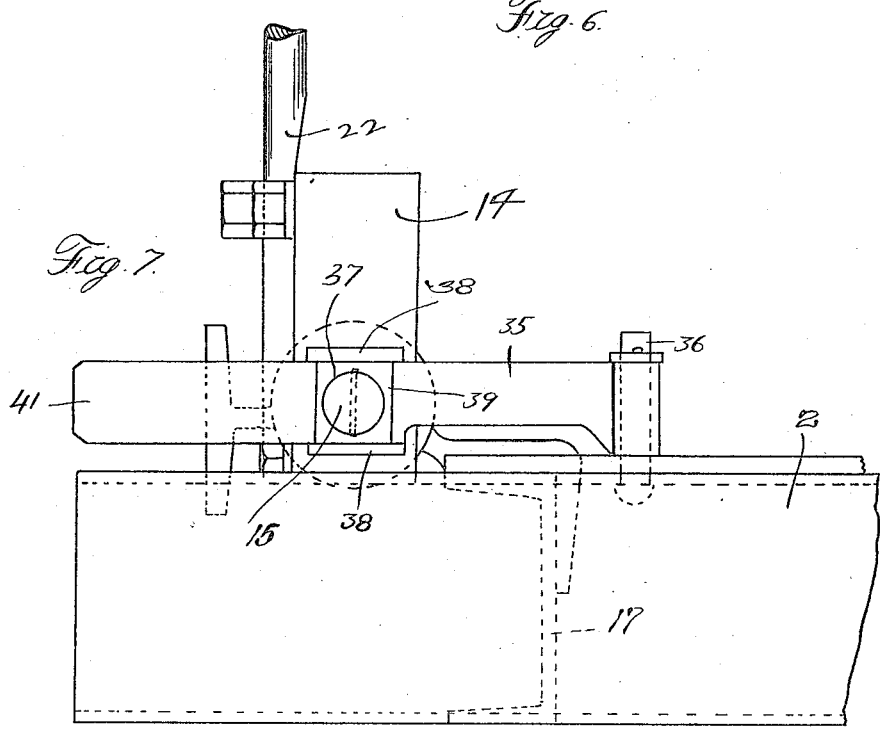
Figure 7 is a fragmentary elevation of the construction illustrated in Figure 5.

Figures 5, 6, and 7 show a provision for locking the blocks in adjusted position. Thus an arm 35 is pivotally mounted on the vertical pin 36 secured to one of the gusset plates 36' of the main frame and is provided with an opening 37 which receives the shaft 15. A pair of parallel flanges 38 extend outwardly from the opposite edges of the arm upon diametrically opposite sides of the openings 37 and are adapted to embrace different sides of a square-shaped block 39 which is rigidly secured to the shaft 15 at the adjacent end thereof. A suitable coil spring 40 surrounds the shaft 15 between the arm 35 and the adjacent block 14 and normally retains the flanges 38 in engagement with the block 39. The arm 35 is preferably provided with an extension 41 which serves as a handle.

When the blocks 14 only are used, either the handle 22 or the handle 27 may be used to rock the shaft 15 to swing the blocks into or out of engagement with the L-shaped portions of the gusset plates. When the retaining device is applied to a vehicle having a relatively wide truck frame, the bolts 29 may be clamped in the blocks and may be adjusted so that the heads 30 thereof will engage the L-shaped portions of the plates 10. When the locking device is applied to the retaining device, the arm 35 may be swung on its pivot 36 to disengage the flanges 38 from the square block 39 so that the shaft 15 may be rocked. After the blocks have been moved to the desired position, the handle 41 may then be released whereupon the spring 40 will swing the arm 35 to establish locking engagement of the flanges 38 with the block 39.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a vehicle having a main frame, a wheeled truck connected thereto and mechanism for steering said truck, of a shaft supported from said frame, plates secured to said truck, blocks upon said shaft adapted to engage said plates to retain said truck in a pre-determined position with respect to said frame, a handle secured to one of said blocks, a rod connected to said shaft and extending to the opposite end of said frame, and a handle upon said rod.

2. The combination with a vehicle having a main frame, a wheeled truck connected thereto and steering mechanism for said truck, of plates secured to said truck, a shaft supported from said frame, blocks keyed upon said shaft and adapted to engage said plates for retaining said truck in a pre-determined position with respect to said frame, said blocks having slots therein, and bolts extending through the portions of said blocks upon opposite sides of said slots for clamping said blocks in position upon said shaft.

3. The combination with a vehicle having a main frame, a wheeled truck connected thereto and mechanism for steering said truck, of a shaft supported from said frame, plates secured to said truck, blocks upon said shaft, and adjustable members carried by said blocks for engaging said plates to retain said truck in a pre-determined position with respect to said frame.

4. The combination with a vehicle having a main frame, a wheeled truck connected thereto and mechanism for steering said truck, of a shaft supported from said frame, plates secured to said truck, blocks keyed upon said shaft, adjustable headed members carried by said blocks and adapted to engage said plates to retain said truck in a pre-determined position with respect to said frame, and means for clamping said headed members in adjusted position.

5. The combination with a vehicle having a main frame, a wheeled truck connected thereto and mechanism for steering said truck, of a shaft supported from said frame, members secured to said truck, members upon said shaft and adapted to engage the members aforesaid to retain said truck in a pre-determined position with respect to said frame, a member upon said shaft, and means engageable with the last-mentioned member for locking the second-mentioned members in adjusted position.

6. The combination with a vehicle having a main frame, a wheeled truck connected thereto and mechanism for steering said truck, of a shaft supported from said frame, members secured to said truck, members upon said shaft and adapted to engage the members aforesaid to retain said truck in a pre-determined position with respect to said frame, a member upon said shaft, and a spring-pressed member having flanges engageable with the last-mentioned member for locking the second-mentioned members in adjusted position.

7. The combination with a vehicle having a main frame, a wheeled truck connected thereto, and mechanism for steering said truck, of a shaft supported from said frame, plates secured to said truck, blocks keyed upon said shaft, headed members adjustably mounted in said blocks and adapted to engage said plates to retain said truck in a pre-determined position with respect to said frame, a member upon said shaft, an arm pivoted upon one of said plates and having an opening receiving said shaft, flanges upon said arm engageable with said member for locking said blocks in adjusted position, and yieldable means normally retaining said flanges in locking engagement with said member.

8. The combination with a vehicle, having a main frame, and a wheeled truck having a frame beneath said main frame, and pivotal relative to said main frame, a shaft mounted upon one of said frames, co-acting latch members respectively secured to the other of said frames, and mounted upon said shaft, said latch members engageable in one position of said shaft, a handle member secured to the latch member on the shaft for rocking said shaft, and a rod connected to said shaft, and extending to the opposite end of the frame for rocking said shaft.

9. The combination with a vehicle having a main frame, and a truck frame pivotally connected to said main frame, of a shaft journaled on one of said frames, a plate secured to the other frame, an arm upon said shaft, and a member adjustable upon said arm, and engageable with said plate to restrain the truck as regards its pivotal movement relative to the frame.

10. The combination with a vehicle having a main frame, and a truck frame pivoted to said main frame, of a shaft journaled upon one of said frames, a plate mounted upon the other frame, an arm carried by said shaft, a headed member adjustable upon said arm in a direction substantially parallel with said shaft, said member being engageable in one position of its adjustment with said plate through rocking of said shaft to restrain pivotal movement of the truck frame with respect to the main frame, and actuating means for said shaft.

11. The combination with a vehicle having a main frame, a wheeled truck connected thereto and steering mechanism for said truck, of a pair of spaced plates secured to said truck, a shaft supported from said frame, a pair of spaced blocks upon said shaft adapted to engage between said plates, and adjustable members carried by said blocks for engaging said plates to retain said truck in a pre-determined position with respect to said frame.

12. The combination with a vehicle having a main frame, a wheeled truck connected thereto and steering mechanism for said truck, of horizontal gusset plates secured to said truck upon opposite sides of the truck frame, shafts extending transversely of said main frame upon opposite sides thereof, and means carried by said shafts adapted to engage between said plates for retaining said truck in a predetermined position with respect to said main frame.

13. The combination with a vehicle having a main frame, a wheeled truck connected thereto and mechanism for steering said truck, of a shaft supported from said frame upon opposite ends thereof, gusset plates rigidly secured to said truck upon opposite sides thereof, each plate having opposite shoulders formed in one edge thereof, and blocks secured to the shafts adjacent the ends thereof adapted to engage between the shoulders of said plates to retain said truck in a predetermined position with respect to said frame.

14. The combination with a vehicle having a main frame, a wheeled truck connected thereto, and mechanism for steering said truck, of a pair of rock shafts journaled on said frame upon the opposite ends thereof, plates secured to the opposite sides of the truck independently of the steering mechanism, blocks secured to said shafts adjacent the ends thereof adapted to engage said plates to retain said truck in a predetermined position with respect to said frame, and means for rocking said shafts from opposite ends of the frame to move said blocks in engagement with said plates.

15. The combination with a vehicle having a main frame, and a wheeled truck pivotally connected to said main frame, and having a sub-frame, of plates secured to one of said frames upon the opposite sides thereof, rock shafts extending transversely of and supported from the opposite ends of the other said frames, blocks carried by said shafts engageable in one position of said shafts between said plates to restrain the truck from pivotal movement relative to the frame, and means for rocking the shafts to move said blocks in engagement with said plates including rods disposed upon opposite sides of said main frame, one end of said rods being journaled on said main frame while the opposite ends thereof are connected to said shafts.

In testimony whereof I affix my signature.

JAMES HARRY CLARK.